Jan. 16, 1968  R. E. BIDWELL ETAL  3,363,627
UNDERWATER DRAINAGE APPARATUS
Filed Oct. 20, 1966  2 Sheets-Sheet 1

INVENTORS
ROBERT E. BIDWELL
SIDNEY MISHKIN

BY *Larson and Taylor*

ATTORNEYS

Jan. 16, 1968  R. E. BIDWELL ETAL  3,363,627

UNDERWATER DRAINAGE APPARATUS

Filed Oct. 20, 1966  2 Sheets-Sheet 2

INVENTORS
ROBERT E. BIDWELL
SIDNEY MISHKIN

BY *Larson and Taylor*

ATTORNEYS

United States Patent Office 3,363,627
Patented Jan. 16, 1968

3,363,627
UNDERWATER DRAINAGE APPARATUS
Robert E. Bidwell, Huntington, and Sidney Mishkin, Roslyn, N.Y., assignors to Deknatel, Inc., Queens Village, N.Y.
Continuation-in-part of application Ser. No. 535,178, Mar. 17, 1966. This application Oct. 20, 1966, Ser. No. 588,060.
19 Claims. (Cl. 128—276)

ABSTRACT OF THE DISCLOSURE

A drainage apparatus for evacuating fluid from cavities including a one-piece container having a trap chamber, a seal chamber, and a pressure regulator chamber. The chambers are arranged to include a continuous passage from said trap chamber through said seal chamber to said pressure regulator chamber. The trap chamber has an opening for connection to the cavity and the seal chamber has an opening for connection to a vacuum source. A stand for holding the container and including a light source, a vacuum source, and controls therefor. An arrangement in which each said chamber has two openings which comprise the only openings to the respective chamber and which are adapted to be opened and closed at will. An enlarged collection reservoir at the top of the seal chamber adjacent the trap chamber. Calibrations on the side of the seal chamber adjacent the trap chamber to indicate the level of the liquid in the seal chamber.

---

Figure 1:
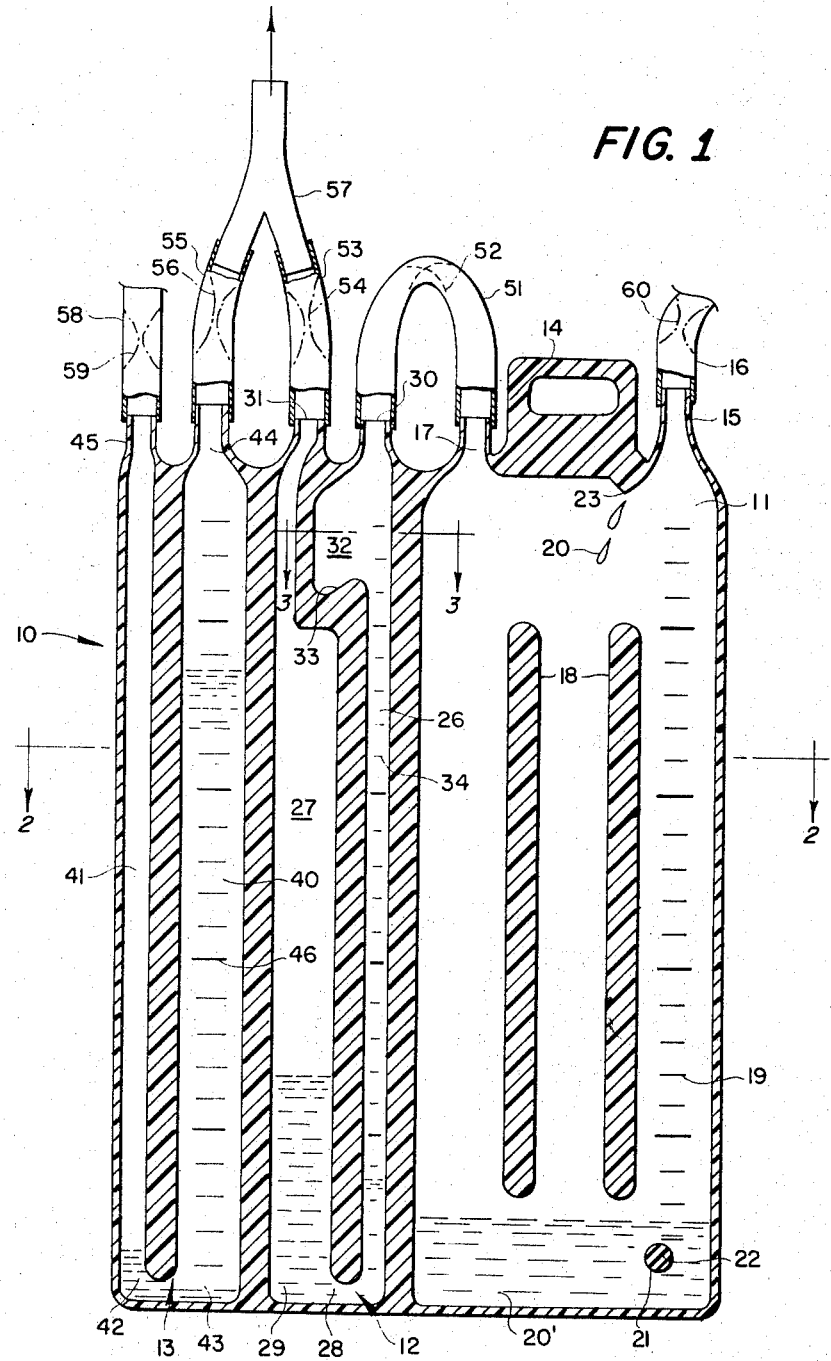

This invention relates to drainage apparatus for draining fluid from a cavity, and in particular to improvements in drainage apparatus of the type disclosed in copending application No. 535,178, filed Mar. 17, 1966, of which this application is a continuation-in-part.

In many scientific areas there exists a need for draining unwanted fluid or other materials from cavities and passages. In the field of medicine, however, it is particularly important to provide this result in a clean and antiseptic environment to insure proper control conditions. For example, to treat potentially dangerous conditions of the lung, a prime consideration is the removal of excess fluid (liquid such as water and blood, and gases such as air) from the pleural cavity between the lungs and the surrounding rib cage. Circumstances which create dangerous conditions include any introduction of fluid into the pleural cavity. This could occur, for example, following a surgical incision through the rib cage in order to perform surgery on the lung itself, or following stab or bullet wounds which pierce the rib cage, or as a result of pleurisy, etc. It is critical to a patient's survival in such instances to keep the pleural cavity relatively free of fluids in order to allow normal pressure changes in the cavity to be restored or at least to maintain normal breathing.

To obtain a more complete understanding of this invention, there follows a brief explanation of the lung structure and the manner in which the general "breathing" function is accomplished. During all aspects of breathing, the chest may be considered like a bellows. That is, the chest wall or rib cage and the diaphragm muscles which separate the chest from the abdomen, expand and contract to respectively enlarge and contract the pleural cavity. This alternate expansion and contraction creates pressure changes within the cavity which operate on the lung itself to maintain the breathing process. Specifically, as the pleural cavity expands, a relatively negative pressure is created in the cavity tending to expand the lungs thereby allowing air to be drawn into the lungs. This aspect of breathing is known as inspiration. Similarly, when the rib cage and diaphragm contract, a relatively positive pressure in the pleural cavity forces air out of the lungs. This is known as expiration. It can therefore be seen that the breathing process is essentially passive in nature, being responsive to pressure changes in the pleural cavity.

Breathing problems develop, in general, when the normal steps of inspiration and expiration are interfered with. Thus, should fluid be introduced into any part of the pleural cavity, the normally passive pressure changes within the pleural cavity will be disturbed and normal breathing is thereby hampered. The presence of such extraneous fluids generally leads to greater-than-normal cavity pressure, which seriously impairs both inspiration and expiration, and can ultimately result in death.

The surgical and medical treatment for relieving such pleural cavity imbalance is generally known as "underwater drainage," and involves the removal of fluids from the cavity and the simultaneous prevention of the further introduction of any additional fluids therein. Clearly, unless fluid removal is successfully achieved and normal breathing restored, death of the patient is a strong possibility.

Previous to the invention disclosed in application 535,178, three basic elements employed to provide the drainage from the pleural cavity where known and these included: first, a container connected to the patient to trap liquids removed from the pleural cavity and to pass therethrough gases similarly evacuated; second, a container having a liquid seal which permits the evacuated gases to be removed from the trap chamber but which prevents the reverse passage of fluids back into the pleural cavity, the second container being connected to a vacuum source to create the necessary negative, or sub-atmospheric, pressure to draw out the accumulated fluids from the pleural cavity; and third, a means for measuring the magnitude of the sub-atmospheric pressure created by the vacuum source. The previous arrangements employed a complex interconnected three-bottle arrangement generally referred to as a "three-bottle" drainage apparatus. In this known apparatus one bottle is employed to provide each of the three basic functions noted above. When used properly this basic three-bottle drainage apparatus does provide the necessary results. However, the arrangement is inherently awkard and inefficient, and easily misused.

To overcome the disadvantages of the previous three-bottle arrangement and to provide a more efficient, more convenient and vastly simplified three-bottle arrangement, a new unitary consolidated "three-bottle" apparatus was invented and is now disclosed and claimed in the said copending application No. 535,178. The portions of the unitary drainage apparatus will be referred to as chambers. The word "bottles" provides a useful analogy to the three-bottle drainage apparatus as has been known heretofore. However, in the present invention there are no separate "bottles" as such and the portions are more accurately referred to as "chambers." The basic arrangement of the apparatus in the present application is similar to the basic arrangement of the said previous application. This basic arrangement is as follows. The one-piece "three-bottle" arrangement is formed from a transparent plastic material. It is of course understood that any desirable material may be utilized to form the apparatus of the present invention, depending on the intended use thereof, and correspondingly suitable methods of manufacture, for example, blow molding, pressure forming, injection molding, slush molding, etc. are possible. The present invention successfully carries out the steps of the underwater drainage principle with a plastic container of unitary construction with a plurality of internally formed chambers, each of which chamber carries out a function previously performed by a separate container. The first chamber is the trap chamber. This chamber is provided with a first opening for receiving liquid, gaseous or solid material from the cavity to be drained. The trap chamber is so designed that the solid or liquid material taken from the cavity will fall to the bottom thereof while the gases removed from the cavity will pass through the trap chamber to a second chamber. The second chamber is the underwater seal chamber. It comprises two columns, the first column connected at its upper end to the trap chamber to receive gases therefrom, and the second column connected at its upper end to a source of vacuum. The two columns of the second chamber are in communication with each other at the bottom ends thereof and a liquid is placed in this second chamber spanning the bottom of the two columns thereof to provide an underwater seal to prevent the reverse passage of fluids back into the trap chamber and possibly from there to the cavity. In order to measure the magnitude of the sub-atmospheric pressure there is provided a third chamber which is essentialy a manometer. The third chamber comprises a first column connected to the said vacuum source at its upper end and a second column connected to the atmosphere at its upper end, the two columns being in communication with each other at the lower ends thereof with a liquid spanning the bottoms of the two columns. The difference between the height of liquid in the two columns in the third chamber indicates the magnitude of the vacuum created by the vacuum source.

In operation the appropriate columns of the second and third chambers are connected to a vacuum source to create a negative pressure within the trap chamber. This has the effect of drawing fluids from the cavity to be drained, such as for example, the pleural cavity. Liquids entering the trap chamber will fall to the bottom thereof to collect while the gases pass through the appropriate connection to the second, or underwater seal chamber. From there, the gases will bubble through the underwater seal and be removed through the vacuum source.

The above discussed unitary "three-bottle" arrangement, as disclosed in application 531,378, represents a substantial improvement over previously known arrangements. However, certain problems have still remained, and it is the purpose of the present invention to provide an improved one-piece "three-bottle'" apparatus which solves these additional problems.

First, the basic one-piece "three-bottle" apparatus has the disadvantage of not being normally operative until the very moment of use since the second and third chambers cannot be filled with liquid until the apparatus is finally placed in the position where it will be used and will not be subjected to further moving about. The chambers are so interconnected that prior to actual usage, fluids would pass haphazardly between the chambers, and it would be difficult, if not impossible, to reallocate the liquids to the proper chambers for proper operation of the apparatus.

Thus, it is one purpose of the present invention to provide a three-bottle drainage apparatus which may be prefilled so that the operator has nothing left to do at the time of usage but to connect appropriate passages to the cavity to be drained, to the vacuum source and to the atmosphere.

To provide this result, according to the present invention, the various gas connections between the chambers have been exteriorized and provided with flexible tube connections such as rubber tubes, which may be easily clamped shut or open at will. Specifically, the gas outlet connection from the trap chamber and the gas inlet connection to the first column of the second chamber are both connected to opposite ends of the same flexible tube which may be opened or clamped shut at will. Secondly, the two connections from the second and third chambers to the vacuum source are each connected to flexible tubes which fit onto each connection at one end and which are free at the other end. These two flexible tubes are clamped shut when the apparatus is not being used. They are rendered operative merely by removing the clamps and connecting each tube to the same vacuum source, for example by means of a Y connector. The connection from the third chamber to atmosphere is also closed by a flexible tube which is clamped shut when not in use. With this arrangement, before the apparatus is rendered operative, each of the two areas having liquids therein initially, that is, the second and third chambers, are each closed off and isolated from the remaining portion of the apparatus.

Prefilling the three-bottle apparatus will vastly improve the utility of the apparatus in many situations. For example, it may be especially important in emergency circumstances such as on a battlefield or where water or other filling liquids are not available at the moment when needed. In these situations a prefilled three-bottle arrangement could be used whereas the previous apparatus which required filling at the point of use could not be used. Thus the difference in structure provided by the present invention could, in some circumstances, mean the difference between life and death.

A second major improvement of the present invention is the provision of a means for measuring the negative intrathoracic pressure within the patient's chest, referred to by the thoracic surgeon as "compliance." As noted above, the second chamber is formed in two columns, one connected at its upper end to the vacuum source and the other connected at its upper end to the trap chamber, with a liquid seal spanning the bottoms of these two columns. The height of the liquid seal in each of the two columns will depend upon the relative pressures above the liquid in those two columns. As the pressure in the patient's chest decreases, the liquid seal will rise in the column of the second chamber connected to the trap chamber. According to the present invention this phenomenon is taken advantage of to measure "compliance." The column of the second chamber connected to the trap chamber is calibrated so that the height to which the liquid in this column rises, and thus the magnitude of the negative pressure in the patient's pleural cavity, can be readily determined.

Another improvement of the present invention is the provision of a means for preventing suction of the liquid forming the liquid seal from the second chamber into the trap chamber in the event that an extremely high negative pressure is developed within the patient and thus, in the trap chamber. As has been noted above, if the pressure within the cavity being drained drops by a sufficient amount, the liquid in the second chamber will rise in the column connected to the trap chamber. If the negative pressure is high enough this liquid can be sucked out of the second chamber into the trap chamber, as the result of which this liquid will be permanently lost to the second chamber and will no longer provide the necessary underwater seal to prevent the reverse flow of gases back into the trap chamber and the cavity being drained.

In order to prevent the possibility of this loss of liquid from the liquid seal into the trap chamber, according to the present invention there is provided a reservoir at the upper end of the second chamber column which is connected to the trap chamber. This reservoir will act as a liquid "trap" in which the liquid seal can "pool" and then subside back to its original location at the lower end of the column when the increased negative pressure in the patient has been reduced. Structurally, this is accomplished by widening the upper end of that second chamber column which is connected to the trap chamber so that all of the water in the second chamber can be pooled in this widened area rather than sucked into the trap chamber.

According to another feature of the invention a means is provided for giving a permanent indication of the fact that water has risen into the reservoir, such indication being given even after the negative pressure within the patient has subsided and the liquid has fallen back to the bottom of the second chamber to reform the seal. Structurally this means is provided by constructing the floor of the widened reservoir at an angle sloped downwardly away from the junction of the reservoir floor with the main portion of the column, to form a well. Thus, after the seal liquid, once pooled in the reservoir, has subsided, a small amount of liquid will remain in the well to give a visual indication that the liquid has reached the well.

Thus, it is a purpose of the present invention to provide an improved unitary one-piece drainage apparatus which overcomes many disadvantages of previous drainage apparatus.

It is a further object of this invention to provide a one-piece drainage apparatus which is so constructed that it may be prefilled prior to use.

It is still another object of this invention to provide a one-piece unitary drainage apparatus having a means for indicating the negative pressure, or "compliance," within the cavity being drained.

It is still another object of this invention to provide a means for preventing loss of liquid from the seal chamber to the trap chamber because of a rise of negative pressure within the trap chamber.

Other objects and the attendant advantages of this invention will become more apparent from the detailed description to follow of a preferred embodiment of the invention, together with the attached drawings wherein:

FIGURE 1 is a side elevational view of a three-bottle drainage apparatus according to the present invention.

Figure 2:
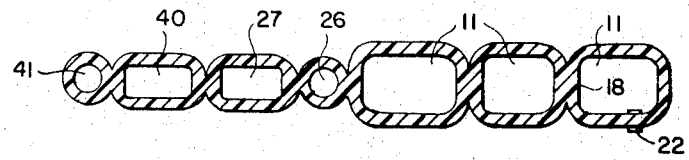
Figure 3:
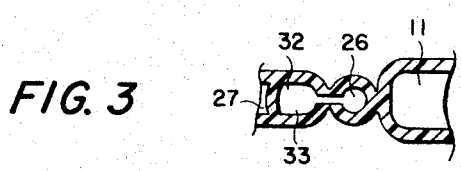

FIGURES 2 and 3 are horizontal sectional views taken along lines 2—2 and 3—3 of FIGURE 1 respectively.

Figure 4:
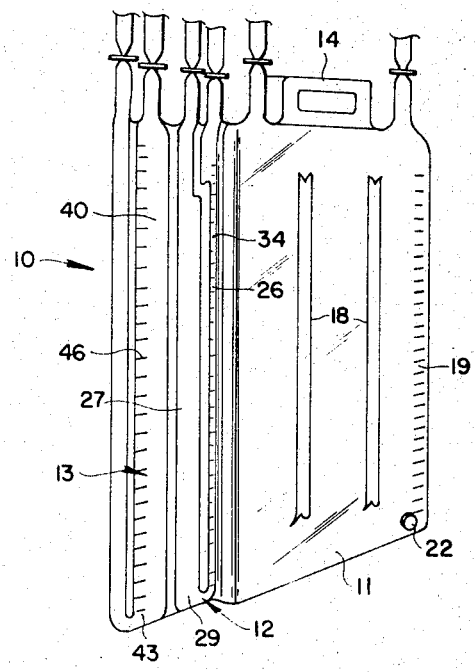

FIGURE 4 is a perspective view illustrating the exterior of the drainage apparatus when closed and prefilled with liquid prior to use.

Referring now to FIGURES 1–3 there is shown an improved drainage apparatus 10 having a first chamber 11 which serves as a trap chamber, a second chamber 12 which serves as a liquid seal chamber and a third chamber 13 which includes a means for measuring the extent of the vacuum to which the second chamber is subjected. A handle 14 is provided at the upper end of the one-piece unitary drainage apparatus in order to facilitate transporting the apparatus with one hand.

The trap chamber comprises an inlet port 15 connected to a tube 16 which extends into the cavity to be drained. An outlet port 17 is provided at a position remote from the inlet port 15 for passing gases into the second, or liquid seal chamber 12. Partitions 18 may be provided across the trap chamber, if desired, as a means for further deflecting the flow of liquid to the bottom of the trap chamber 11. Calibrations 19 are provided on the side of the trap chamber for indicating the level of the liquid 20' received from the cavity being drained and collecting at the bottom of the trap chamber. An aperture 21 together with a diaphragm 22 is provided at the bottom of the trap chamber to allow the removal of the trapped liquid for purposes of analysis. This greatly facilitates bacterialogical and hematological studies. A drip ledge 23 is provided near the inlet port 15 to direct the liquid to the bottom of the trap chamber and prevent the same from entering the gas outlet port 17.

The second chamber 12 comprises a first column 26 and a second column 27 which two columns are connected at their lower ends through an opening 28. The liquid 29 spans the bottom of these two columns, the height of the liquid in each column being determined, of course, by the relative pressure in the two columns above the liquid. The first column 26 has an inlet port 30 which receives gas from the trap chamber 11, and the column 27 has a connection 31 at its upper end which is connected to a vacuum source.

Under normal operating conditions the vacuum created by the vacuum source would tend to cause a slight rise of the liquid in column 27 although the level of the liquid in each of the two columns could be equal. However, on occasion the negative pressure in the cavity being drained increases, causing the liquid in the column 26 to rise. According to the present invention this rise of liquid in column 26 is employed to measure the negative pressure within the cavity being drained (and of course in the trap chamber). To this end, calibrations 34 are provided on the side of column 26 to give a visual reading of the height of the liquid in column 26 and thus of the magnitude of the negative pressure or "compliance" within the cavity.

It is possible that the negative pressure within the trap chamber could become so great that the water in the second chamber would rise completely through column 26, leave that chamber and enter the trap chamber 11. If this happens then the use of the liquid seal would be completely lost. In order to prevent this from occurring there is provided at the upper end of column 26 a widened reservoir 32 in which the water may "pool" in the event that it rises above the level of the floor of the reservoir.

If the negative pressure within the patient does rise to this extent, then this fact would be of medical significance and the doctor would wish to be informed of this fact. If the doctor is present at the moment the liquid is rising he can observe the same by reading the graduations on the side of column 26. However, the rising of the liquid may occur when the doctor is not in attendance. With the present invention, the floor 33 of the reservoir 32 is downwardly and outwardly sloped as a result of which some liquid will remain in the widened area even after the pool has subsided. Thus, on arriving in the morning, or after a long absence, the doctor would see the pooling of the water in this upper well and would immediately visualize the negative pressure which had occurred simply by observing the graduation on the column 26 across from the edge of the sloped floor 33. For example, in FIGURE 1 liquid within the pool 33 would indicate that a negative pressure of at least 21.5 cc. of water had occurred.

By comparing FIGURES 2 and 3 it can be seen that the reservoir 32 can be provided without enlarging the overall width of the unitary drainage apparatus. The reservoir 32 simply extends into the upper portion of the column 27.

The third chamber, or measuring chamber 13 comprises a first column 40 and a second column 41, which two columns are connected at their lower ends through opening 42. Liquid 43 spans the bottoms of these two columns. Connection 44 at the upper end of column 40 is directed to the same vacuum source as is connected to column 27 while the upper end of column 41 is directed to the atmosphere. Thus, in this manner the third chamber acts as a manometer for measuring the vacuum to which the column 27 is subjected. For example, FIGURE 1 shows a vacuum of 18.5 cc.

A feature of this present invention is a means for providing within a unitary one-piece three chamber drainage apparatus a mechanism for allowing isolation of the separate liquid containing chambers so that the respective chambers may be prefilled with liquid while excluding the risk of having the liquid move irreversibly from one chamber to another. To this end of the outlet port connection 17 from the trap chamber and the inlet port 30 to the column 26 are connected by a flexible tubing 51 which may be clamped shut as shown in dotted lines at 52 in FIGURE 1. Similarly the outlet connections 31 and 44 have connected thereto separate flexible tubes 53 and 55 each being adapted to be closed by a clamp as shown at dotted lines 54 and 56 respectively. The connection 45 also has connected thereto a flexible tube 58 which is adapted to be clamped shut as shown at dotted lines 59. The tube 60 may also be clamped shut for purposes of cleanliness although this clamp serves no purpose in containing liquid since prior to use there is no liquid within the trap chamber 11.

FIGURE 1 illustrates the position of the rubber tubing in use. All of the clamps are removed so that tube 16 is directed to the cavity to be drained, the tubing 51 connects the trap chamber to column 26, the two tubes 53 and 55 are opened and directed to a common vacuum source, for example through a Y connector 57 and finally the tube 58 is opened to allow air at atmospheric pressure to enter the column 41.

FIGURE 4 illustrates, in perspective, the one-piece unitary drainage apparatus in the condition in which it may be transported directly to the point of use where it may be made operable by simply releasing the clamps and making the necessary tube connections. It can be seen that all of the tubular connections are closed and that predetermined quantities of liquid are located within chambers 12 and 13 respectively, each chamber being isolated from the exterior and from other chambers of the apparatus.

The operation of the invention is as follows:

Starting with the apparatus as shown in FIGURE 4, the apparatus is first placed upright so that the liquid in chambers 12 and 13 will fall to the bottoms thereof. Clamps are then removed, opening tubes 60, 51, 53, 55 and 58. Tubes 53 and 55 are connected to a source of vacuum such as a vacuum pump and the remote end of tube 60 is inserted into the cavity to be drained. The extent of the vacuum created by the vacuum source is indicated by the difference in the levels of the liquid in columns 40 and 41. Assuming for example that the patient is an adult male with a significant accumulation of excess fluids in the pleural cavity, it would be desired to establish a relatively high pressure head. Typically, such a head could measure approximately 20 to 30 centimeters of water and this can be determined by referring to the graduations on the column 40. In response to the establishment of this pressure as indicated by the third chamber 13, the liquid in the underwater seal chamber 12 will tend to rise in the column 27 which is connected to the vacuum source while of course it will fall in the column 26.

Assuming that the established pressure is sufficient to commence draining of the hypothetical adult male patient, some of the excess fluids (gases and liquids together) will begin to pass from the pleural cavity through the inlet 15 to the trap chamber 11. The liquid portion of the fluids, indicated in FIGURE 1 as 20, will strike the drip ledge 23 and be directed towards the bottom of the trap chamber 11 as indicated at 20'. The evacuated gases (predominantly air) are drawn by the applied suction into the second chamber from the chamber 11 through the outlet port 17, and through tube 51 and connection 30 to the column 26 which contains the underwater seal 29. Because of the suction applied in the column 27 the gases will bubble through the liquid 29 and enter the column 27 from which the gases will pass through connection 31, rubber tubing 53 and connection 57, to the vacuum source. This drawing of bubbles through the liquid 29 will continue until the draining has been completed. It might be observed that the application of suction also causes bubbles to pass from the atmosphere through liquid 43 to the vacuum source. When drainage is complete bubbles through 29 will terminate while bubbles will still be observed passing through liquid 43.

The normal or steady state operation of the apparatus has been described above. Assume now, however, that the negative pressure, or the "compliance," within the pleural cavity of the patient increases drastically. The pressure within the trap chamber 11 would be reduced by a large amount relative to its steady state pressure. Consequently the fluid 29 would rise in the column 26. In previous drainage apparatus this rising fluid might continue into the trap chamber and thus be permanently lost from the seal chamber 12. If a source of water or other liquid is not readily available, this will mean that the underwater seal feature will be permanently lost. In the present invention, however, this fluid will not pass into the trap chamber since it will be collected in a reservoir 32. It may occur that the negative pressure within the patient will increase to fill the reservoir 32 and then subside before a doctor can notice the change. However, even after the seal liquid has subsided, some liquid will remain within the well provided by the outwardly downwardly sloped reservoir floor 33. Thus, the physician will be immediately informed of the fact that the negative pressure in the cavity has risen to the level indicated by the graduation 34 on the column 26 adjacent the edge of floor 33.

Although the invention has been described in considerable detail with respect to a preferred embodiment thereof, it should be apparent that the invention is capable of numerous modifications and variation without in any way departing from the spirit and scope of the invention as set forth in the claims. For example, the connecting tubes can be of any suitable material so long as they can be easily clamped shut and yet strong enough to resist collapse when subjected to negative pressure from the vacuum source and possibly from within the chamber being drained. Also, of course the connections must be located near the upper end of the chambers. However they need not necessarily be at the uppermost position as precisely shown in the drawings. Also, of course the reservoir 32 serves the functions of pooling the seal liquid but need not be at the precise height or of the particular width shown.

In some situations positive pressure within the plural cavity will be great enough to cause pumping fluids from the cavity through the first chamber and through the underwater seal of the second chamber, even without a means for creating a vacuum pressure in the second chamber. In this situation the third chamber would not normally be required since there would be no vacuum pressure to measure. In still other situations even when employing a negative pressure in the second chamber, it may be unnecessary or undesirable to employ a third chamber for measuring the magnitude of the negative pressure in the second chamber. Thus, it is contemplated that the features of this invention may be employed in an apparatus having only first and second chambers as well as one having three chambers.

Numerous other variations and modifications are clearly possible without departing from the spirit and scope of the invention as set forth in the appended claims wherein we claim:

1. An apparatus for draining fluids from a cavity comprising:
   at least a first chamber and a second chamber: said first chamber including an inlet for receiving gaseous and liquid fluids from the cavity to be drained and an outlet through which gases pass to the second chamber; said second chamber including a first opening for receiving gases from the first chamber, a second opening adapted to be connected to a vacuum source for expelling gases from the second chamber and a means for permitting the establishment of a liquid seal between the said first and second openings; said first and second chambers being connected together by an integral connecting portion and thus formed together as a one-piece unitary unit, said first chamber outlet and said first opening of the second chamber being connected together so that they are in fluid communication with each other; said second chamber first and second openings being the only two openings to the second chamber for use in normal operation, the said openings being constructed to be closed in a first condition to isolate the second chamber, and to be opened in a second condition to place the second chamber into communication with the first chamber to expel gases from the second chamber.

2. An apparatus as claimed in claim 1 including a first flexible tube exterior of said one-piece unitary unit connecting the first opening of the second chamber to the said outlet of the first chamber, and a second flexible tube connected to the second opening of the second chamber and adapted to be opened to expel gases from the second chamber, and means for closing the said tubes to prevent flow of fluid therethrough.

3. An apparatus as claimed in claim 1 including a third chamber connected to the second chamber by an integral connecting portion and having a means for measuring the pressure within the second chamber on the side of the liquid seal away from the first chamber.

4. An apparatus as claimed in claim 3 wherein the said third chamber includes only two openings for normal operation, the first of the two openings being an opening to atmosphere and the second of the two openings being adapted to be connected to the second chamber, the said two openings being constructed to be closed in a first condition to isolate the third chamber and to be opened in a second condition to place the third chamber in communication with atmosphere and the second chamber.

5. An apparatus as claimed in claim 4 including a first flexible tube exterior of apparatus connecting the first opening of the second chamber to the said outlet of the first chamber, a second flexible tube connected to the opening of the second chamber through which gases are expelled, a third flexible tube connected to the opening at the third chamber which is adapted to be connected to the second chamber, and a fourth flexible tube connected to the opening from the third chamber to atmosphere, and means for selectively closing each of the said flexible tubes to prevent the flow of fluid therethrough.

6. An apparatus as claimed in claim 5 including a means within said second chamber for preventing the liquid forming the liquid seal from entering the first chamber when the absolute pressure in the first chamber is reduced to a level lower than the absolute pressure in the second chamber by a predetermined amount, and including a measuring means within the second chamber for measuring the differential between the pressure in the second chamber and the pressure in the first chamber.

7. An apparatus as claimed in claim 6 wherein the second chamber comprises two adjacent parallel vertical columns connected at their lower ends, an opening at the upper end of the first column forming the said opening to the first chamber, and an opening at the top of the second column forming the said opening for expelling gases, the liquid seal comprising a body of liquid normally located at the lower end of the two columns, and the said means for preventing the liquid seal from entering the first chamber comprising a widened reservoir area near the upper end of the said first column.

8. An apparatus as claimed in claim 7 wherein the said measuring means includes calibrations on the side of the said first column to indicate the difference in the levels of the said seal liquid in the first and second columns.

9. An apparatus for draining fluids from a cavity comprising:
at least a first chamber and a second chamber: said first chamber including an inlet for receiving gaseous and liquid fluids from the cavity to be drained and an outlet through which gases pass to the second chamber; said second chamber including a first opening for receiving gases from the first chamber, a second opening adapted to be connected to a vacuum source for expelling gases from the second chamber, said second chamber having a means for permitting establishment of a liquid seal between the said first and second openings, said first chamber outlet and said first opening of the second chamber being connected together so that they are in fluid communication with each other; and including a measuring means within the second chamber for measuring the differential between the pressure in the second chamber and the pressure in the first chamber.

10. An apparatus as claimed in claim 9 wherein the second chamber comprises first and second vertical columns connected at their lower ends and opened at their upper ends, the upper opening from the first column forming the said opening to the first chamber and the opening from the second column being the opening for expelling gases, and wherein the said measuring means includes calibrations on the side of the said first column of the second chamber to indicate the difference in the levels of the said seal liquid in the first and second columns.

11. A one-piece drainage apparatus comprising a first chamber, a second chamber and a third chamber, the said second chamber having one integral connecting portion common with the first chamber and one integral connecting portion common with the third chamber, said second chamber comprising two vertical columns connected together at the lower end thereof, each column being opened at the upper end thereof to the outside of the apparatus, said third chamber also including two vertical columns connected at the lower ends thereof and each column opened at the upper end thereof to the outside of the apparatus, and said first chamber having at its upper end thereof an inlet opening and an outlet opening, separate flexible tubes being connected to each of the said first chamber inlet opening, to one of the openings of the second chamber, and to each of the openings of the third chamber, and a single flexible tube connecting the outlet opening of the first chamber to the remaining opening of the second chamber, each of said flexible tubes including a means for selectively closing each of the flexible tubes to prevent the flow of fluids therethrough.

12. An apparatus as claimed in claim 11 wherein the column within the second chamber in communication with the first chamber has at its upper end thereof a widened reservoir adapted to collect fluids which rise upwardly along the first column of the second chamber towards the connection of that column to the first chamber.

13. An apparatus for draining fluids from a cavity comprising:
a one piece unitary unit having at least a first chamber and a second chamber formed internally therein; said first chamber including an inlet for receiving gaseous and liquid fluids from the cavity to be drained and an outlet through which gases pass to the second chamber; said second chamber including a first opening for receiving gases from the first chamber, a second opening adapted to be connected to a source of vacuum pressure for expelling gases from the second chamber, said first chamber outlet and said first opening of the second chamber being connected together so that they are in fluid communication with each other, said second chamber including a means for permitting the establishment of a liquid seal between the first and second openings; and including a means within said second chamber for preventing the liquid forming the liquid seal from entering the first chamber when the apparatus is in the operative position and when the absolute pressure in the first chamber is at a level lower than the absolute pressure in the second chamber by a predetermined amount.

14. An apparatus as claimed in claim 13 wherein the interior of the second chamber comprises two adjacent and generally parallel vertical columns in fluid communication with each other at their lower ends, an opening at the upper end of the first column forming the said opening to the first chamber and an opening at the top of the second column forming the said opening for expelling gases and the said means for preventing the liquid seal from entering the first chamber comprising a widened reservoir area near the upper end of said first column.

15. An apparatus as claimed in claim 19 including a third chamber adapted to receive a means for measuring the pressure within the second chamber on the side of the liquid seal away from the first chamber.

16. An apparatus as claimed in claim 14 wherein the cross-sectional area of the main portion of the first column below the widened reservoir of the second chamber is much less than the cross-sectional area of the second column of the second chamber.

17. An apparatus as claimed in claim 14 wherein the bottom of the said reservoir includes a portion which slopes downwardly away from the main portion of the first column to form a pocket.

18. An apparatus as claimed in claim 14 wherein the said first and second chambers are formed together as a one-piece unitary unit including an integral connecting portion located between and integrally connecting together the first and second chambers, said integral connecting portion having a passageway passing therethrough and connecting the first chamber to the first opening of the second chamber.

19. An apparatus as claimed in claim 18 including a third chamber adapted to receive liquid for forming a manometer means for measuring the pressure in the second chamber and including a second integral connecting portion located between and integrally connecting together the second and third chambers, and a passageway formed in and passing through the last said integral connecting portion placing the second column of the second chamber in fluid communication with the third chamber.

References Cited
UNITED STATES PATENTS

| | | | |
|---|---|---|---|
| 1,936,129 | 11/1933 | Fisk | 128—297 |
| 2,936,757 | 5/1960 | Trace | 128—276 |
| 3,279,467 | 10/1966 | Hofstra et al. | 128—276 |

RICHARD A. GAUDET, *Primary Examiner.*

CHARLES F. ROSENBAUM, *Examiner.*

PO-1050
(5/69)

UNITED STATES PATENT OFFICE
CERTIFICATE OF CORRECTION

Patent No. 3,363,627          Dated January 16, 1968

Inventor(s) Robert E. Bidwell and Sidney Mishkin

It is certified that error appears in the above-identified patent and that said Letters Patent are hereby corrected as shown below:

Column 10, line 72, the numeral "19" should read --14--.

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents